June 4, 1957 A. J. SCHENK 2,794,538
SLACK SENSING MEANS FOR ENDLESS CONVEYORS
Filed Dec. 6, 1954
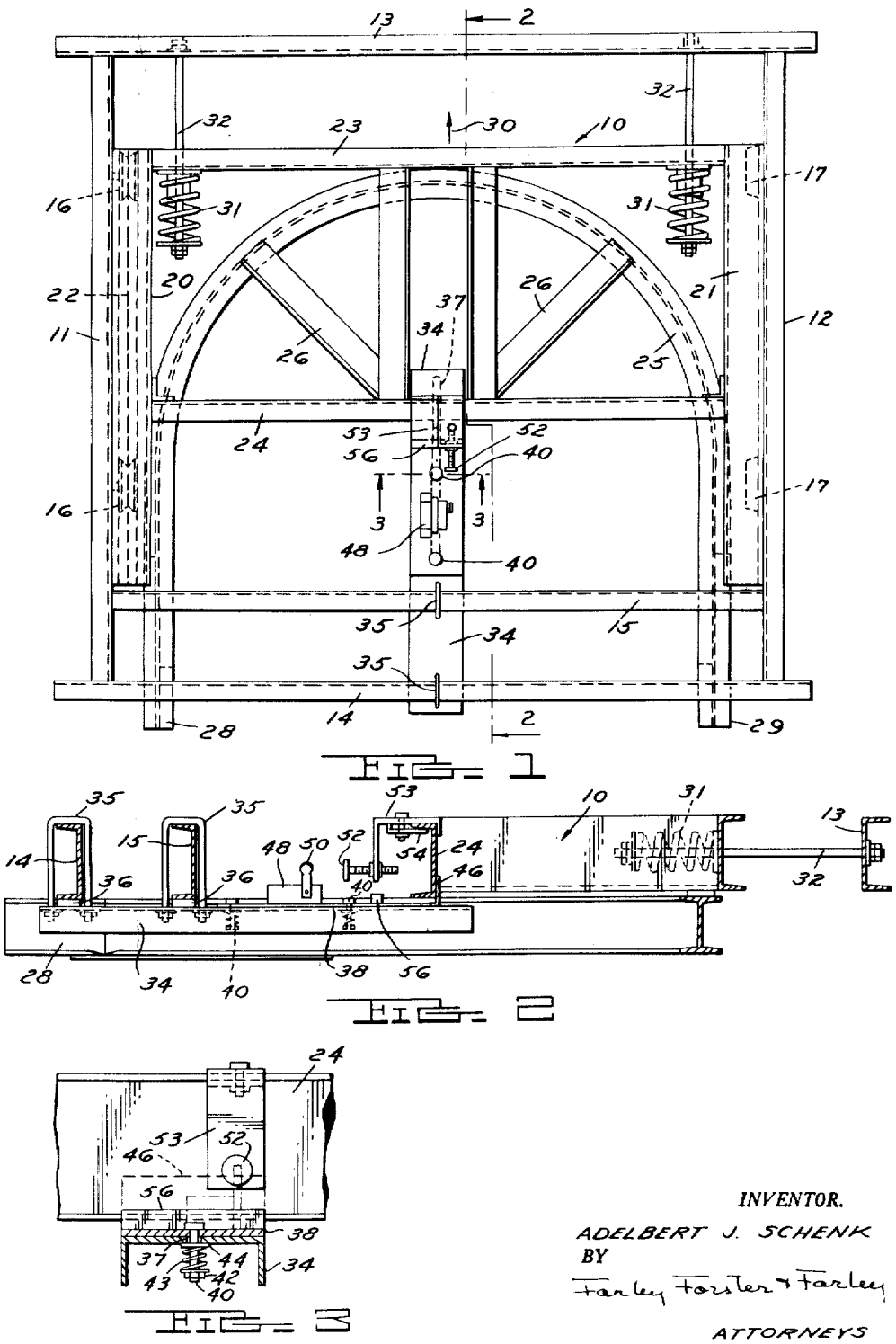
INVENTOR.
ADELBERT J. SCHENK
BY
Farley, Forster & Farley
ATTORNEYS

2,794,538
SLACK SENSING MEANS FOR ENDLESS CONVEYORS

Adelbert J. Schenk, Huntington Woods, Mich., assignor to Jervis B. Webb Company, Detroit, Mich., a corporation of Michigan Application December 6, 1954, Serial No. 473,168

12 Claims. (Cl. 198—208)

This invention relates to a device for sensing undue withdrawal of slack from the take-up of an endless conveyor or, in other words, for sensing undue movement of the take-up in the direction opposite to that in which it takes up slack.

The use of take-ups in conveyor installations is well-known. A take-up is normally located on the exit side of a conveyor drive unit, where the tension in the endless conveyor member is least, and provides a means for accommodating and locating any excess length, or slack, of the moving conveyor member. The take-up functions to maintain a certain minimum degree of tension in the conveyor member in order to keep it straight and pulled away from the drive unit. If anything should happen in the conveyor system which would result in a take-up not being able to function in this intended manner serious difficulties can be encountered. This is particularly true in multiple drive conveyors using only one take-up. If for any one of a number of reasons, slack is not contained by a take-up, the synchronous control of the multiple driving units will undoubtedly be effected. If enough slack is drawn out of take-up, sufficient slack may appear at some part of the conveyor system to cause the conveyor member to wrap around one of the driving units, resulting in a jam. Certain types of rivetless chain employed for an endless conveyor member may fall apart if too loose.

Many conditions can be encountered in the operation of a conveyor system, particularly a multidrive one, which result in slack being drawn out of the take-up, and it is the principle object of the present invention to provide a device for use in association with a take-up which will provide a means for sensing the undue withdrawal of slack therefrom. Conveyors are normally operated unattended. The sensing means of the invention provides a signal that attention is required so that the system can be stopped or adjusted before damage and lost, or "down" time can occur.

The term "take-up" as employed herein is intended to denote a device which provides a variable length path of travel for the conveyor member. It is supported upon suitable stationary structure or framework for movement between a closed position and an open position, and is normally urged towards open position by springs, weights, or a combination of both so that any slack in the conveyor member is drawn into the take-up by opening movement thereof. When a conveyor system is installed, some excess length is provided in the conveyor member. This is drawn into the take-up and a certain value of tension in the conveyor member thereby established. Any decrease in the value of this tension such as might be caused by a temperature increase, wear, stretch, etc. (in other words, an increase in length of the conveyor member) will be accompanied by further opening movement of the take-up and an increase in the amount of slack accommodated thereby. Conversely, should the tension in the conveyor member increase such as might result from a temperature decrease or change in length, or by one drive unit pulling against another drive unit on the other side of the take-up, then a closing movement of the take-up will result and slack will be drawn out of it.

According to the present invention a device is provided which will sense movement of a take-up towards closed position, or in other words sense the withdrawal of slack from a take-up in an amount in excess of that normally required to compensate for changes in length or tension of the conveyor member due to temperature or minor variations in loading, or minor variations in relative speed between adjacent drive units of a multiple drive system. This sensing function must be performed by the device irrespective of the position or degree of opening of the take-up at the time of withdrawal of slack begins. In other words, the sensing function must be accomplished throughout the range of take-up movement.

This is accomplished by providing a member carried by stationary structure and unidirectionally connected to the movable take-up for movement relative to the stationary structure upon opening take-up movement, together with means for preventing a change in position of this member upon closing take-up movement. Means for actuating a sensing device are carried by the member and adapted to be contacted by the take-up upon closing movement thereof in excess of a given amount. Preferably, an actuating member is also carried by the take-up and is adjustably positionable relative thereto so that the amount of closing take-up movement required to actuate the sensing device can be easily varied.

The manner in which the sensing device is employed in the conveyor system forms no part of the present invention. Obviously the signal secured from the sensing device could be employed either to actuate some warning mechanism and/or to stop the conveyor before a more serious malfunctioning occurs.

A representative embodiment of the invention is disclosed in the accompanying drawings which comprise the following views:

Fig. 1, a plan view of a conventional take-up construction on which the sensing device of the invention has been mounted;

Fig. 2, a sectional elevation taken along the line 2—2 of Fig. 1 showing the mounting of the sensing device and its relation between the take-up and stationary supporting framework therefor; and Fig. 3, a sectional elevation taken along the line 3—3 of Fig. 1.

A brief description of the take-up construction will first be given so that the operation of the device may be more readily understood.

Referring to Fig. 1, the take-up, generally indicated by the reference 10, is supported in a stationary framework which includes longitudinal members 11 and 12 appearing at the left and right side of the drawings, respectively, transverse end members 13 and 14 and a third transverse member 15. A pair of V rollers 16 are carried on the left longitudinal frame member 11. A pair of plain rollers 17 are carried on the right longitudinal member 12.

The movable take-up frame includes a pair of side members 20 and 21 of channel section, the upper flange of the member 20 being provided with a V way which rides on the V rollers 16. The upper flange of the channel member 21 is engaged by the plain rollers 17. Cross members 23 and 24 connect the take-up frame side members 20 and 21 and a U-shaped conveyor I beam rail 25 is supported in this framework, being braced by suitable angle members generally designated 26. The ends of the rail section 25 mate with and overlap conveyor rail sections 28 and 29 carried by the stationary framework, and telescoping rail joints of conventional type are employed.

In Fig. 1 the take-up 10 is shown in its fully closed position relative to the stationary framework. It is normally urged in the direction of the arrow 30 toward an open position by a pair of springs 31, each carried on a bolt 32 secured to the fixed cross member 13 and preloaded into engagement with the cross member 23 of the take-up frame.

All the foregoing take-up structure is conventional, and is intended as illustrative only of a particular take-up device with which the present invention may be employed.

As best shown in Figs. 1 and 2 the construction of the sensing device includes a channel-shaped base member 34 which is clamped to the transverse stationary frame members 14 and 15 by a pair of U bolts 35, employing suitable spacer blocks 36. Base member 34 is provided with a longitudinally extending slot 37. A positionable member 38 is slidably mounted on the base member 34 and is connected thereto by a pair of bolts 40 which pass through the slot 37 in the base member 34 and are drawn into engagement by a nut 42 acting against a spring 43 which bears against a washer 44 on the underside of the base member 34 (see Fig. 3).

One end of the positionable member 38 is formed with an upturned flange 46 which extends upwardly in the path of opening movement of the cross member 24 of the take-up frame. Contact between the frame member 24 and flange 46 of the positionable member establishes a unidirectional connection therebetween so that upon opening movement of the take-up frame (in the direction of the arrow 30) the positionable member is drawn with the take-up 10, sliding along the surface of the base member 34.

A sensing device such as a limit switch 48 including an actuating member 50 may be mounted on the positionable member 38.

A second actuating member 52 is carried by a bracket 53 which is secured to the take-up frame member 24 by the rail clamp 54. The actuating member 52 threadedly engages the bracket 53 so that its position relative to the take-up frame can be adjusted in the direction of take-up frame movement. Thus the distance between the actuating member 52 can be varied with respect to the actuating member 50.

As the take-up frame moves towards its open position, the positionable member 38 is drawn with it through the engagement of the flange 46 and frame member 24 previously mentioned. If the direction of movement of the take-up 10 should reverse due to an increase in tension of the conveyor member, the positionable member 38 is held at its position of greatest movement in the opening direction by the frictional engagement created between the member 38 and the base member 34, as adjusted by the nuts 42 and springs 43 which clamp these members 34 and 38 together. The actuating member 52 is preferably pre-set so that a certain amount of movement of the take-up frame towards closed position will take place before the actuating members 52 and 50 contact to operate the limit switch 48. Hence the device can be set to sense closing movement of the take-up frame only in excess of a given amount.

A stop or lug 56 is secured to the positionable member 38 so as to lie in the path of travel of the take-up frame member 24 on closing movement thereof. This stop 56 is positioned to serve two purposes, one to prevent excessive contacting engagement between the two actuating members 50 and 52 and thereby avoid damage to a sensitive mechanism such as a limit switch; and second, to act to positively return the positionable member 38 to a new setting with closing movement of the take-up when excess slack is removed therefrom so that the desired limits of relative motion between the member 38 and the take-up 10 are always maintained.

While the limit switch 48 is disclosed as a sensing element, this is representative only of some device that can be employed for obtaining a signal in response to contact between the two actuating members; or, in other words, in response to relative movement between the take-up and positionable member in a closing direction in excess of that desired.

The specific construction described is intended only to be representative of the invention, the scope of which is defined in the following claims.

I claim:

1. For use with a take-up structure having a given range of movement from a closed position to an open position, means for sensing a movement of the take-up structure in a closing direction in excess of a certain amount comprising an actuating member carried by said take-up structure for movement therewith, a second actuating member, means supporting said second actuating member for movement with said take-up in the opening direction only, means for preventing a change of position of said second actuating member as a result of closing movement of said take-up, said second actuating member being positioned for contact by said first actuating member upon a given amount of movement of said take-up in a closing direction.

2. For use with a take-up for handling slack in an endless conveyor member, said take-up being mounted in a stationary supporting framework for a range of normally urged opening movement in response to a decrease in tension in said conveyor member and for closing movement in response to an increase in tension in said conveyor member; means for sensing closing movement of said take-up in excess of a given amount from any open position within the range of take-up movement comprising a sensing device and means for actuating said sensing device, said actuating means including a member carried by said take-up, a second member carried by said stationary framework for movement relative thereto, means for moving said second member in response to opening movement of said take-up, and means for preventing a change of position of said second member upon closing movement of said take-up.

3. Sensing means as defined in claim 2 wherein the actuating member carried by said take-up is adjustably positionable relative thereto.

4. For use with a take-up for handling slack in an endless conveyor member, said take-up being mounted in a stationary supporting framework for a range of normally urged opening movement in response to a decrease in tension in said conveyor member and for closing movement in response to an increase in tension in said conveyor member; means for sensing closing movement of said take-up in excess of a given amount from any open position within the range of take-up movement comprising a member supported by said stationary framework for movement relative thereto, means for establishing a unidirectional connection between said member and said take-up whereby said member is moved relative to said stationary framework upon movement of said take-up in an opening direction, means for preventing movement of said member relative to said stationary framework as a result of movement of said take-up in a closing direction, a sensing device, and means for actuating said sensing device in response to a change in the relative position between said member and said take-up upon closing movement of the latter.

5. For use with a take-up for handling slack in an endless conveyor member, said take-up being mounted in a stationary supporting framework for a range of normally urged opening movement in response to a decrease in tension in said conveyor member and for closing movement in response to an increase in tension in said conveyor member; means for sensing closing movement of said take-up in excess of a given amount comprising a base plate adapted to be fixedly secured to said stationary framework, a member slidably carried by said base plate, said member having means adapted to be contacted by said take-up upon movement thereof in an opening direction whereby the position of said member relative to said stationary framework varies in accordance with opening movement of said take-up, means for preventing a change in such position of said member in response to movement of said take-up in a closing direction, and means for actuating a sensing device carried by said member, said actuating means being positioned to be contacted by said take-up closing movement thereof.

6. Sensing means according to claim 5 wherein a device for contacting said actuating means is carried by said take-up and is adjustably positionable relative to said take-up in the direction of take-up movement.

7. Sensing means according to claim 5 wherein said means for preventing a change in such position of said member in response to movement of said take-up in a closing direction comprises means for urging said member into frictional contact with said base plate.

8. For use with a take-up for handling slack in an endless conveyor member, said take-up being mounted in a stationary supporting framework for a range of normally urged opening movement in response to a decrease in tension in said conveyor member and for closing movement in response to an increase in tension in said conveyor member; means for sensing closing movement of said take-up in excess of a given amount comprising a base plate adapted to be fixedly secured to said stationary framework, a positionable member slidably carried by said base plate, said positionable member having a projecting flange adapted to be contacted by said take-up upon opening movement thereof whereby the position of said member on said base plate is varied in response to opening movement of said take-up, means for frictionally fixing the position of said member relative to said base plate whereby such position will be maintained upon movement of said take-up in a closing direction, a sensing device carried by said member, and means carried by said take-up for actuating said sensing device upon movement of said take-up in a closing direction, said actuating means being adjustably positionable relative to said take-up in the direction of take-up movement.

9. Sensing means according to claim 8 further characterized by means for moving said positionable member in a closing direction with said take-up after closing movement thereof exceeds the said certain amount and said sensing device has been actuated.

10. Sensing means according to claim 9 wherein the means defined therein comprises a stop carried by said positionable member, said stop being located to be contacted by said take-up after the closing movement thereof has actuated said sensing device.

11. An endless conveyor take-up device including a take-up structure supported on a stationary framework for engagement with the conveyor and normally urged for movement in an opening direction to take up slack in the conveyor in which means is provided for sensing undue withdrawal of slack from the take-up, said sensing means comprising a member mounted for movement with the take-up structure in the opening direction only, means for preventing a change of position of said member upon movement of the take-up structure in a closing reverse direction, and a second member carried by said take-up structure and mounted to contact said first member upon a certain amount of movement of the take-up structure in said reverse direction.

12. An endless conveyor take-up device according to claim 11 wherein said first member is displaceably carried by said stationary framework, means establishing a lost motion connecting between said first member and the take-up structure whereby said member will move with the take-up structure in the opening direction and will be held stationary upon movement of the take-up structure in the closing direction.

References Cited in the file of this patent
UNITED STATES PATENTS 2,345,931     Gates  ---------------- Apr. 4, 1944

FOREIGN PATENTS 590,625     Great Britain  ---------- July 23, 1947

UNITED STATES PATENT OFFICE

CERTIFICATE OF CORRECTION

Patent No. 2,794,538 June 4, 1957

Adelbert J. Schenk

It is hereby certified that error appears in the printed specification of the above numbered patent requiring correction and that the said Letters Patent should read as corrected below.

Column 5, line 6, after "take-up" insert -- upon --.

Signed and sealed this 8th day of October 1957.

(SEAL)
Attest:
KARL H. AXLINE
Attesting Officer

ROBERT C. WATSON
Commissioner of Patents